(12) United States Patent
Norris

(10) Patent No.: US 7,111,244 B2
(45) Date of Patent: Sep. 19, 2006

(54) METHOD AND APPARATUS FOR FACILITATING MEETINGS, CONFERENCES AND FORUMS INVOLVING FACE-TO-FACE DISCUSSION BETWEEN PARTICIPANTS

(76) Inventor: Daniel Norris, 24 Stanhope Avenue, Finchley, London N3 3LX (GB)

( * ) Notice: Subject to any disclaimer, the term of this patent is extended or adjusted under 35 U.S.C. 154(b) by 986 days.

(21) Appl. No.: 09/924,468

(22) Filed: Aug. 9, 2001

(65) Prior Publication Data

US 2002/0097688 A1    Jul. 25, 2002

Related U.S. Application Data

(63) Continuation of application No. PCT/GB00/00412, filed on Feb. 9, 2000.

(30) Foreign Application Priority Data

Feb. 9, 1999    (GB) .................................. 9902797.1

(51) Int. Cl.
*G06F 3/00* (2006.01)
(52) U.S. Cl. .................................... 715/753; 715/751
(58) Field of Classification Search ................ 715/751, 715/753, 755, 758; 709/204
See application file for complete search history.

(56) References Cited

U.S. PATENT DOCUMENTS

| | | | |
|---|---|---|---|
| 4,250,491 A | | 2/1981 | Dotson |
| 4,645,878 A | | 2/1987 | Hilger et al. |
| 4,777,488 A | | 10/1988 | Carlman, Jr. et al. |
| 4,807,095 A | | 2/1989 | Bell |
| 5,943,042 A | * | 8/1999 | Siio ............................ 345/172 |
| 5,974,446 A | * | 10/1999 | Sonnenreich et al. ....... 709/204 |
| 6,061,716 A | * | 5/2000 | Moncreiff ................... 709/204 |
| 6,415,555 B1 | * | 7/2002 | Montague .................... 52/36.2 |
| 6,422,558 B1 | * | 7/2002 | Chambers .................... 273/146 |
| 6,466,154 B1 | * | 10/2002 | Kim et al. ................... 341/176 |
| 6,519,629 B1 | * | 2/2003 | Harvey et al. .............. 709/204 |
| 6,766,356 B1 | * | 7/2004 | Krautter ...................... 709/204 |
| 6,973,437 B1 | * | 12/2005 | Olewicz et al. ................ 705/15 |
| 2002/0016788 A1 | * | 2/2002 | Burridge ....................... 707/10 |
| 2002/0188681 A1 | * | 12/2002 | Gruen et al. ................. 709/204 |
| 2004/0157200 A1 | * | 8/2004 | Lohse ......................... 434/332 |

* cited by examiner

*Primary Examiner*—Sy D. Luu
(74) *Attorney, Agent, or Firm*—Clark & Brody

(57) ABSTRACT

A method and apparatus for facilitating meetings, conferences and forums involving face-to-face discussion or conversation between participants. The invention may also be used as a form of entertainment or to enhance Internet cafes and leisure facilities. Other embodiments of the invention may be used to facilitate networking sessions, training sessions, educational programs and public consultations. In the method of the invention the communication system is used to structure and coordinate live face-to-face communication between users in person. The invention enables participants to immediately identify subjects that are of special interest and importance to each of them. Groups of participants are then able to concurrently discuss a very large number of subjects using the highly interactive protocols of natural face-to-face conversation. The invention also provides means to alter the trajectory of discussion between users, particularly in the light of previous discussions. Further refinements increase the invention's functionality and improve its user interface.

37 Claims, 1 Drawing Sheet

METHOD AND APPARATUS FOR FACILITATING MEETINGS, CONFERENCES AND FORUMS INVOLVING FACE-TO-FACE DISCUSSION BETWEEN PARTICIPANTS

RELATION TO PRIOR APPLICATIONS

This application is a continuation of international application number PCT GB00/00412, filed Feb. 9, 2000, (status, abandoned, pending, etc.).

The present application claims priority under the Patent Cooperation Treaty to International Application Serial No. PCT/GB00/00412 filed Feb. 9, 2000, said application being incorporated herein by reference. The international application claims priority from an earlier UK application GB 9902797.1 filed Feb. 9, 1999.

BACKGROUND OF THE INVENTION

The present invention generally relates to the field of communications and more particularly, is directed to a method and apparatus that may be used to facilitate meetings, conferences and forums involving discussion or conversation between participants. The invention may also be used as a form of entertainment or to enhance Internet cafes and leisure facilities. Other embodiments of the invention may be used to facilitate networking sessions, training sessions, educational programs and public consultations. The invention may be utilized as well by market research to constitute study groups for qualitative research and by media and news gathering organizations that require direct access to public opinion.

Conferences of various types where participants meet to converse and receive information are well known in the prior art. Typically, a speaker speaks about a subject that may be of interest to other participants who serve as a passive audience to a single monolithic lecture. The subject being discussed, however, may not be of interest to all members of the audience. There is limited scope for participants to communicate with the speaker and very limited scope for interaction between participants. Accordingly, the needs of all participants may not be served.

The emergence of the Internet has had, and will continue to have for the foreseeable future, a great impact on the world's ability to communicate. The Internet makes it easy for participants to set-up and join forum groups to communicate with other participants who share interests. No conference facility yet exists, however, that provides an efficient framework which enables participants to do this in person. Existing live conference facilities do not support structured and dynamic networked communication. Existing live conference facilities do not provide an efficient interactive technology to enable groups of participants to concurrently discuss a plurality of explicitly defined subjects within a structured and modifiable framework.

Discussion groups are also well known. Current live discussion group structures have a major problem when the discussion transforms into another subject. Some members may wish to continue the original subject and others may wish to continue with a variant. Furthermore the original subject may not have been of interest to members of a parallel group while the variant is more interesting to them than the subject they are discussing. The rigidity of existing discussion groups inhibits mutation of the subject matter and the likelihood of beneficial interactions.

Virtual discussion groups are also known in the art. Virtual discussion groups, for example those conducted by e-mail or web-cam, have major disadvantages in that many complex components of communication are lost even if images of them are transmitted. Significantly, the "cues" that provide the higher order protocols to direct discussion are not effectively reproduced by these systems. These "cues" include, for example, body language, facial expressions, tone and inflection of voice. Such "cues" play an important role in directing and shaping the exchange between participants. Attempts have been made to add a degree of "personality" to electronic communications, especially in respect to e-mail messages. For example, many e-mail users use a smiling or frowning face symbol to indicate their mood to the receiving party. While doing so improves the communication experience, it does not replace the benefit of face-to-face discussion during a communication exchange.

Live face-to-face communication between users conveys more information and allows greater interactivity than communication systems that rely on audio, video or digital technologies. It is evident that the transduction and transmission of verbal and non-verbal visual communication signals by these systems can only result in the loss of information and the loss of interactivity between users. A communications system that facilitates live face-to-face communication will have many significant advantages.

Existing communications systems transduce and transmit communication signals between users. In prior communications systems, communication between users takes place primarily through the communication system itself. There is no disclosure or suggestion of the use of a physically embodied communications system to structure and coordinate live face-to-face discussion amongst groups of users.

Accordingly, there is a need in the art for improved communications systems and methods over those presently known in the art.

SUMMARY OF THE INVENTION

The invention provides a communication system and method that is wholly different in usage and purpose to any communication system and method that exists or has been proposed or alluded to in the art. Existing communications systems do not provide any means to structure and coordinate live discussion amongst groups of participants. The method of communication of the invention is fundamentally different to the method associated with prior communication systems. In prior communications systems, communication between users takes place through the communication system itself. In the method of the invention, the communication system is used to structure and coordinate live face-to-face communication between users in person.

In some embodiments, the present invention is a programmable communications system that enables users to participate efficiently in structured and dynamic networked communication.

Unlike existing live conference facilities, the invention enables participants to immediately identify subjects that are of special interest and importance to each of them. Groups of participants are then able to concurrently discuss a plurality (and typically a very large number of subjects) using the highly interactive protocols of natural face-to-face conversation.

Some aspects of the invention provide a communication system and method to structure and coordinate live discussion between users. Some aspects of the invention provide first for dynamic discussion and secondly for participants to be aware on a substantially real time basis of what subjects are currently being discussed. Further refinements improve the invention's functionality and user interface.

Existing communication systems transduce and transmit communications signals between users. The use of a physically embodied communications system to capture parameters of the system comprising live and concurrent discussion between users in permutable groups is an important inventive step.

The use of a physically embodied communications system to display and set parameters of the system that comprises live and concurrent discussion between users in permutable groups, is a further important inventive step. It is significant that state transitions in the physically embodied communications system may induce state transitions in the system comprising live discussion amongst groups of users. The proposed communications system and method is able to alter the trajectory of discussion between users. The use of a physically embodied communications system to alter the trajectory of the system comprising discussion amongst groups of users is a further important inventive step.

It can therefore be seen that the invention lies partly in the formulation of the problems to be solved. In the present case the solution to these problems involves providing a plurality of locations accessible to permutable groups of users at which discussion takes place as well as locally or remotely controllable indicia to indicate the subject for discussion. As the discussion mutates, indicia relating to the subject to be discussed are also changed. Those no longer captivated by the subject currently under discussion can form a separate group with like-minded individuals or can, guided by the other indicia, find a subject which is of interest to them.

Accordingly, it is an objective of the present invention to provide a communication system and method that is wholly different in usage and purpose to any communication system and method that exists or has been proposed or alluded to in the art. Existing communications systems do not provide any means to structure and co-ordinate live discussion amongst groups of participants.

The present invention includes the following features and advantages.

The quality of communication between users will be higher than that achievable by any other known communications system and method as the invention incorporates the significant advantages of live face-to-face discussion between users.

Participants are able to concurrently discuss a plurality (and typically a very large number) of subjects using the highly interactive protocols of natural face-to-face conversation.

This novel communications system and method provides objects and advantages that are nowhere apparent in the art. The invention specifically includes the following objectives.

It is an objective of the present invention to provide a communication method and apparatus to structure and coordinate live concurrent discussion amongst groups of participants.

It is another objective of the present invention to provide a communication method and apparatus which enables users to immediately and explicitly identify the purpose of a plurality (and typically a large number) of concurrent discussion groups.

It is an objective of the present invention to provide a communication method and apparatus which enables participants to decide which of a plurality of discussion groups they would like to join.

It is an objective of the present invention to provide a communication method and apparatus which enables participants or service providers to create a plurality (and typically a large number) of discussion groups for concurrent discussion. (By the use of remote controls)

It is another objective of the present invention to provide a communication method and apparatus which enables participants to explicitly alter the purpose of discussion groups particularly in the light of previous discussions. (By the use of local controls)

It is an objective of the present invention to provide a communication method and apparatus which enables participants and/or service providers to create new discussion groups again particularly in the light of previous discussions. (By the use of local and remote controls)

It is an objective of the present invention to provide a communication method and apparatus which enables participants to explicitly identify a plurality of 'subject zones' in which a plurality of discussion groups discuss related subjects.

It is an objective of the present invention to provide a communication method and apparatus which enables participants or service providers to create a plurality of 'subject zones' which include a variable plurality of discussion groups.

It is an objective of the present invention to provide a communication method and apparatus which enables users to allocate any new discussion group to any 'subject zone'.

It is an objective of the present invention to provide a communication method and apparatus which enables users to explicitly alter the purpose of 'subject zones' particularly in the light of previous discussions.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT OF THE INVENTION

Figure 2:
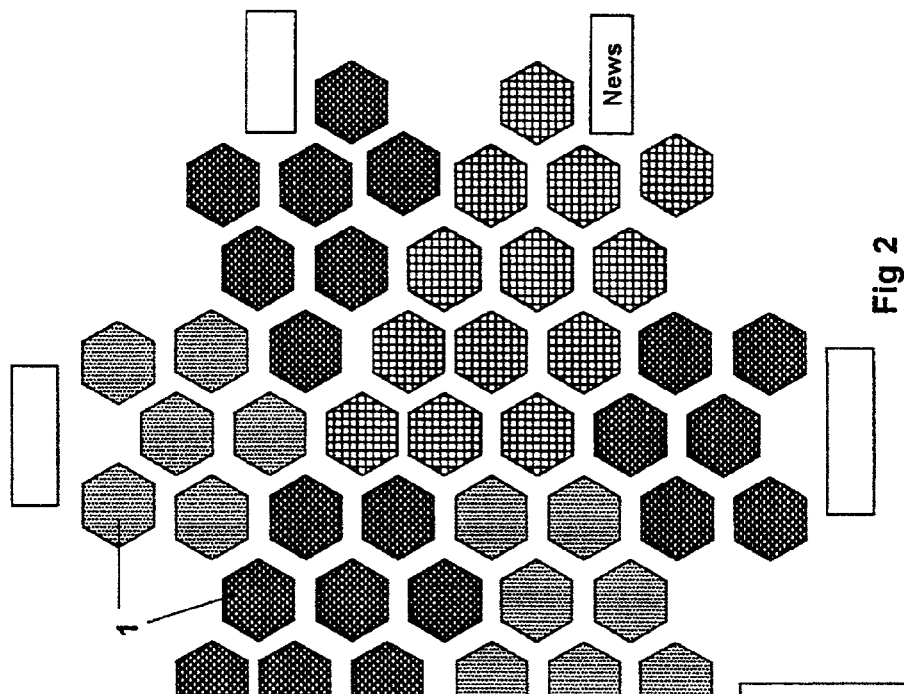
FIG. 2 is a plan view of one embodiment of the present invention.

According to the invention there is provided a communications system comprising an array of spaced apart locations at each of which a plurality of users may enter into discussion with one another, each location being provided with indicia associated with a subject for discussion, and means for altering the indicia at at least a location to indicia associated with a further subject.

In some embodiments of the invention a remote control is provided for remotely altering the indicia at least a location to indicia associated with a further subject. In some preferred embodiments of the invention the remote control can alter substantially all the indicia at the spaced apart locations.

In some embodiments of the invention each location is provided with a local electronic control for altering the indicia at that location to indicia associated with a further subject.

Some embodiments of the invention comprise a remote control for remotely altering the indicia at a location and a local control for locally altering the indicia at a location and means for reporting to the remote control data associated with the indicia displayed at the location.

In some embodiments, the invention is a programmable forum that includes discussion topic signs (indicia). In the context of this invention a forum group is defined as a group of users who wish to pursue a particular discussion or conversation. Some embodiments of this invention may be set up in such a way as to enable users to gather together at the spaced apart locations to form forum groups. Accommodation may therefore be provided at the spaced apart locations to enable members of forum groups to sit together.

In some embodiments of the invention at least one location comprises seating. In some embodiments of the invention at least one location comprises a table at which users may sit or stand.

Discussion topic signs (indicia) are arranged within some embodiments of this invention in such a way that they indicate the type of discussion or conversation that forum groups wish to pursue. Users may be accommodated around or near discussion topic signs or other visual or symbolic means may be used to link discussion topic signs with specific locations.

Discussion topic signs (indicia) are used to display discussion topics or themes or conversation topics or themes. Discussion topic signs may use any means, any materials or any form of technology to display these things. Discussion topic signs may for example be:—electronic (e.g. using LED, LCD, plasma displays, VDU monitors or any other form of electronic display), they may be handwritten (e.g. on an electronic notepad), they may be mechanical or electromechanical or assembled using magnetic characters, they may be computer generated or optically generated (for example by projection).

In some embodiments of the invention, indicia comprising audio or video messages are used instead of text based discussion topic signs. These audio or video discussion topic signs consist of messages which are used to identify the discussion topic or theme or conversation topic or theme that is associated with a specific location.

Discussion topic signs may be amended to display new discussion topics, discussion themes or conversation themes. Discussion topic signs may be operated and amended by any known means such as: through a keyboard, by handwriting, by erasing, through a computer mouse, by touch screen, by assemblage of alphabetical characters and so on.

The following communication protocols are important features of some preferred embodiments of this invention:
(1) A discussion topic sign is used to indicate the type of discussion or conversation that members of a forum group wish to pursue.
(2) Information displayed on discussion topic signs can be altered, replaced or otherwise amended.
(3) A new forum group can be set up by displaying a new topic or theme on a discussion topic sign.

In some embodiments of the invention more than one topic may be displayed on the same discussion topic sign. This sort of discussion topic sign may take the form of a map, diagram of the forum or a chart which can be used to indicate what is being discussed by more than one forum group.

In some embodiments of the invention a display is provided for displaying a plurality of the subjects currently for discussion. In some preferred embodiments of the invention a display is provided for displaying all of the subjects currently for discussion. In some embodiments means are provided for the display to be altered by the remote control that alters the indicia at the spaced apart locations. In some embodiments means are provided for altering the display from at least one of the spaced apart locations.

Locations in which forum groups are discussing similar types of subject may be clustered into named topic zones. This may be achieved by visually or physically linking together locations into zones. For example, locations may be physically clustered together into a topic zone which is named by some form of sign. Names of zones may be fixed or changeable. Names of topic zones may be changed by changing the sign associated with that topic zone.

In some embodiments of the invention indicia are provided that are local to a plurality of locations as well as means for altering the indicia to enable users to identify a subject that is common to those locations. In some embodiments of the invention a display unit is provided to display subjects that are common to a plurality of locations together with the subjects that are associated with each of those locations.

Topic zones may be fixed or changeable in terms of the number of locations they contain. This may be achieved by colour coding. For example users may be seated at tables which may each be lit in different colours. Changeable topic zones can be created by lighting tables in the same zone in the same colour.

In some preferred embodiments of the invention locations comprise a table at which users may sit or stand. In some embodiments of the invention tables have a top illuminatable in colour associated in a look up table with the subject to be discussed. This enables tables, at which users are discussing similar subjects, to be illuminated in the same colour. In some embodiments, indicia are provided that may be altered to associate discussion subjects with colours used to illuminate tables.

In some embodiments of the invention, the facility may be divided into named topic zones but may not utilize discussion topic signs.

In some embodiments of the invention the indicia comprise colour. So that indicia associated with similar subjects may display these subjects in the same colour.

Figure 1:
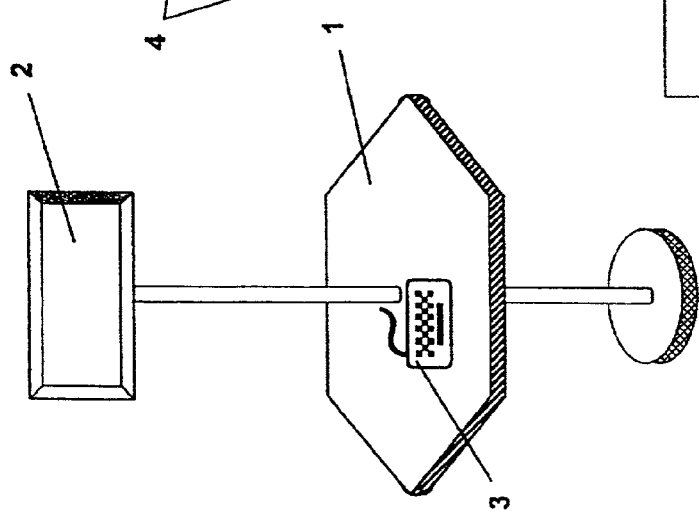
FIG. 1 illustrates a table which accommodates users and electronic sign-board in accordance with the present invention.

FIG. 1 shows a table 1 which accommodates users and an electronic sign-board 2 which is used to display subjects for discussion. In some embodiments of the invention the electronic sign-board 2 can be altered remotely by a microcomputer. In some embodiments the electronic sign-board 2 can be operated locally by a keyboard 3. In some embodiments the electronic sign-board 2 can be operated both locally and remotely.

FIG. 2 shows a plan view of a possible embodiment in which users are accommodated at loosely tessellated hexagonal tables. (this is not a scale diagram and spaces between tables would be greater than the appearance of the diagram suggests). FIG. 2 shows hexagonal tables 1 that are grouped into coloured zones in which users discuss similar subjects. Zones are identified by large electronic signboards 4. Surfaces of tables in the same zone are lit in the same colour. A table adjacent to a zone may therefore be added to a zone by illuminating its surface in the colour that codes for that zone.

Figure 3:
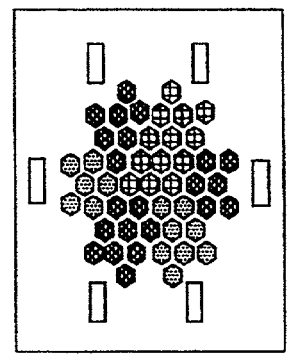
FIG. 3 is an illustration of a display unit in accordance with the present invention.

FIG. 3 is a view of a display unit. Electronic discussion topic sign-boards communicate with the display unit FIG. 3 which provides an overview of the whole facility and shows what is being discussed at each table as well as displaying the names and colours of topic zones.

This invention includes the method of communication that arises from the use of the communications system described herein.

Advantages of at least some aspects of the invention can be clearly quantified using combinatorial analysis. A traditional lecture based conference provides only one monoplexed communication channel between participants. An aspect of the invention provides a vastly greater number of explicitly defined multiplexed communication channels between a huge number of permutable sub-groups of users.

Considering an embodiment of the invention that can accommodate 300 participants at locations that each accommodate a maximum of 6 participants. If the number of locations is greater than 50 (nominally 60 locations) then the total number of possible user groups is given by:

$$_6^{300}C + _5^{300}C + _4^{300}C + _3^{300}C + _2^{300}C$$

The first of these terms alone ($_6^{300}C$) is $9.628 \times 10^{11}$.

If we restrict ourselves to consider only 6 participant user groups at 50 locations each of which is uniquely identified by indicia displaying a different discussion topic then the total number of different ways in which users may communicate with one another is given by:

$$_6^{300}C \times _6^{294}C \times _6^{288}C \times \ldots \times _6^{6}C$$

I.e. $_6^{300}C$ different user groups may communicate at the first location, $_6^{294}C$ different user groups may communicate at the second location and so on.

This expression represents the total number of possible communication networks between users. It is a vast number that is difficult to calculate. Nonetheless it is easy to show that it greatly exceeds $10^{200}$.

If each of the indicia may be amended to facilitate the creation of new networked groups then the total number of system trajectories becomes incalculable.

The invention in some aspects provides an explicit and dynamic communications system and method that facilitates vastly greater connectivity between users than any existing live conference facility. The huge potential for networked connectivity between users is an important unexpected result of the invention.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A method of communication to facilitate forums for discussion, said method comprising: providing an array of spaced apart locations at each of which a plurality of users may enter into discussion with one another, providing each location with indicia associated with a subject for discussion, displaying discussion topics by said indicia at said spaced apart locations, enabling users to gather together at said spaced apart locations to form groups to pursue the discussion indicated by said indicia, displaying a new discussion topic by at least one of said indicia at said spaced apart locations to set up a new discussion group, providing a remote control to remotely alter said indicia at at least one of said spaced apart locations to display new discussion topics to set up a new discussion group at said location, and controlling said indica at at least one of said spaced apart locations remotely by said remote control whereby users may participate in person in structured and dynamic networked discussion.

2. The method of claim 1 wherein said remote control can alter the indicia at a plurality of said spaced apart locations.

3. The method of claim 1 further providing a local control at at least one of said spaced apart locations to locally alter the indicia at the location associated with said local control to indicia associated with a further subject for discussion.

4. The method of claim 3 further providing means for reporting to said remote control data associated with the indicia displayed at the location associated with said local control.

5. The method of claim 1 further providing at least one location with seating.

6. The method of claim 1 further providing at least one location with a table at which users may sit or stand.

7. The method of claim 6 further providing means to illuminate the table top in a color associated in a look up table with the subject to be discussed.

8. The method of claim 6 further providing means to illuminate the table top in a color associated with the subject to be discussed and further providing indicia that may be altered to associate discussion subjects with the colors used to illuminate tables.

9. The method of claim 1 further providing a display for displaying a plurality of the subjects currently for discussion.

10. The method of claim 9 further providing means for said display to be altered by said remote control that alters the indicia at the spaced apart locations.

11. The method of claim 9 further providing means for altering the display from at least one of the spaced apart locations.

12. The method of claim 1 further providing indicia that are local to a plurality of locations and means for altering the indicia to enable users to identify a subject that is common to those locations.

13. The method of claim 12 further providing a display unit to display subjects that are common to a plurality of locations together with the subjects that are associated with each of those locations.

14. The method of claim 1 providing locations with indicia that comprise color whereby indicia associated with similar subjects may display these subjects in the same color.

15. The method of claim 1 to facilitate any one selected from the group consisting of: meetings, conferences, forums, networking sessions, training sessions, educational programs, entertainment, public consultations, qualitative research by market researchers, the gauging of public opinion and news gathering.

16. A method of communication to facilitate forums for discussion, said method comprising: providing an array of spaced apart locations at each of which a plurality of users may enter into discussion with one another, providing each location with indicia associated with a subject for discussion, displaying discussion topics by said indicia at said spaced apart locations, enabling users to gather together at said spaced apart locations to form groups to pursue the discussion indicated by said indicia at said spaced apart locations, displaying a new discussion topic by at least one of said indicia at said spaced apart locations to set up a new discussion group, providing a local electronic control at each of said spaced apart locations to locally alter the indicia at the location associated with said local control to display a new discussion topic to set up a new discussion group at said location, and controlling said indicia at least one of said spaced apart locations locally by said local electronic control whereby users may participate in person in structured and dynamic networked discussion.

17. The method of claim 16 further providing a display for displaying a plurality of the subjects currently for discussion.

18. A communications system, said system comprising; an array of spaced apart locations at each of which a plurality of users may enter into discussion with one another, each location being provided with indicia associated with a subject for discussion, and a remote control for remotely altering said indicia at at least a location to indicia associated with a further subject, wherein said indicia are used to display discussion topics and said indicia may be amended to display new discussion topics, wherein said communications system includes the following communication protocols: (1) said indicia are used to indicate the type of discussion or conversation that members of a discussion group wish to pursue (2) information displayed by said indicia can be altered, replaced or otherwise amended, and (3) a new discussion group is set up by displaying a new discussion topic.

19. A method to facilitate forums for discussion, said method comprising:
providing an array of spaced apart locations at each of which a plurality of users may enter into discussion with one another in person,
providing each of a plurality of locations with a sign for displaying indicia associated with a subject for discussion,
enabling users to gather together at locations to form groups to pursue the discussion indicated by the sign at those locations,
displaying a discussion topic by the sign at at least one location to set up a discussion group at that location,
providing a remote control for operating at least one sign so as to enable that sign to display a subject for discussion wherein said remote control can alter the indicia displayed by that sign,
enabling said remote control to remotely control the sign at at least one of said spaced apart locations,
displaying subjects for discussion at a plurality of locations, whereby users may participate in person in structured and dynamic discussion.

20. The method of claim 19 wherein said remote control can operate the signs at a plurality of said spaced apart locations.

21. The method of claim 19 further providing a local control at at least one of said spaced apart locations for locally controlling the sign at the location associated with said local control.

22. The method of claim 19 further providing at least one location with a table.

23. The method of claim 22 further providing means to illuminate the table top in a color associated with the subject to be discussed.

24. The method of claim 19 further providing a display for displaying a plurality of the subjects currently for discussion.

25. The method of claim 19 providing said sign at all of said spaced apart locations wherein said remote control can operate all of the signs.

26. The method of claim 19 further providing indicia that display a subject that is common to a plurality of locations.

27. The method of claim 19 providing locations with indicia that comprise color whereby indicia associated with similar subjects may display those subjects in the same color.

28. The method of claim 19 to facilitate any one selected from the group consisting of: meetings, conferences, forums, networking sessions, training sessions, educational programs, entertainment, public consultations, qualitative research by market researchers, the gauging of public opinion and news gathering.

29. A method to facilitate forums for discussion, said method comprising:
providing an array of spaced apart locations at each of which a plurality of users may enter into discussion with one another in person,
providing each of a plurality of locations with a sign for displaying indicia associated with a subject for discussion,
enabling users to gather together at locations to form groups to pursue the discussion indicated by the sign at those locations,
displaying a discussion topic by the sign at at least one location to set up a discussion group at that location,
providing a local control at a plurality of the locations that have a sign wherein said local control can operate the sign at the location associated with said local control so as to enable that sign to display a subject for discussion and said local control can alter the indicia displayed by the sign at the location associated with said local control,
enabling said local control to locally control the sign at the location associated with said local control,
displaying subjects for discussion at a plurality of locations, whereby users may participate in person in structured and dynamic discussion.

30. The method of claim 29 further providing a display for displaying a plurality of the subjects currently for discussion.

31. The method of claim 29 providing said sign and said local control at all of said spaced apart locations.

32. The method of claim 29 further providing indicia that display a subject that is common to a plurality of locations.

33. The method of claim 29 further providing at least one location with a table and further providing means to illuminate the table top in a color associated with the subject to be discussed.

34. A communications system, said communications system comprising:
an array of spaced apart locations at each of which a plurality of users may enter into discussion with one another in person,
signs for displaying subjects for discussion wherein each sign is associated with a location whereby said signs are able to display subjects for discussion at the location associated with each sign,
control means for operating said signs so as to enable said signs to display subjects for discussion wherein said control means can amend the information displayed by said signs so as to enable said signs to display new subjects for discussion, wherein said communications system includes the following communication protocols:

(1) said signs indicate the type of discussion that members of a discussion group wish to pursue,
(2) information displayed by said signs can be altered, replaced or amended, and
(3) a new discussion group is set up at a location by displaying a new discussion topic by the sign associated with that location.

35. The communications system of claim 34, said communications system further including a display for displaying a plurality of the subjects currently for discussion.

36. The communications system of claim 34 further including indicia that display a subject that is common to a plurality of locations.

37. The communications system of claim 34, said communications system further including a table at at least one location and means to illuminate the table top in a color associated with the subject to be discussed.

* * * * *